United States Patent [19]

Nashif

[11] Patent Number: 5,020,978

[45] Date of Patent: Jun. 4, 1991

[54] APPARATUS AND METHOD FOR REDUCING VEHICULAR FUEL PUMP NOISE

[76] Inventor: Ahid D. Nashif, 9698 Ash Ct., Cincinnati, Ohio 45242

[21] Appl. No.: 444,054

[22] Filed: Nov. 30, 1989

[51] Int. Cl.$^5$ .......................................... F04B 11/00
[52] U.S. Cl. .................................. 417/363; 188/178; 248/559
[58] Field of Search ............... 417/360, 363, 371, 410, 417/423.3, 423.14, 423.15; 222/385; 248/559, 635; 188/178, 179, 180

[56] References Cited

U.S. PATENT DOCUMENTS

| | | |
|---|---|---|
| 650,290 | 5/1900 | Wirt . |
| 2,046,193 | 6/1936 | Spicer . |
| 3,130,700 | 4/1964 | Peterson . |
| 3,419,111 | 12/1968 | Jones et al. . |
| 3,601,228 | 8/1971 | Nashif . |
| 3,667,706 | 6/1970 | Tiberghien ........................ 188/379 |
| 3,856,107 | 12/1974 | Rabett . |
| 4,448,538 | 5/1984 | Mantel . |
| 4,453,693 | 6/1984 | Krux ............................... 248/559 |
| 4,590,964 | 5/1986 | Beardmore ........................ 417/363 |
| 4,699,243 | 10/1987 | Enoki . |
| 4,800,306 | 1/1989 | Oberto ............................. 188/379 |

OTHER PUBLICATIONS

*Standard Handbook for Mechanical Engineers*, T. Baumeister, Ed. McGraw-Hill, 5/1967, pp. 5-90-5-103.

Primary Examiner—Leonard E. Smith
Assistant Examiner—David L. Cavanaugh
Attorney, Agent, or Firm—Wood, Herron & Evans

[57] ABSTRACT

Noise of a vehicular fuel pump is reduced by determining the major frequency range of the objectionable noise and the deformation patterns of vibrating elements of the pump, and providing a passive vibrator which has designed mass, stiffness and damping values that cause it to resonate in the major frequency range and to provide an out-of-phase reaction force which is of sufficient magnitude to offset the undesired vibration. The passive vibrator may be mounted on the pressure or return line of the pump.

11 Claims, 4 Drawing Sheets

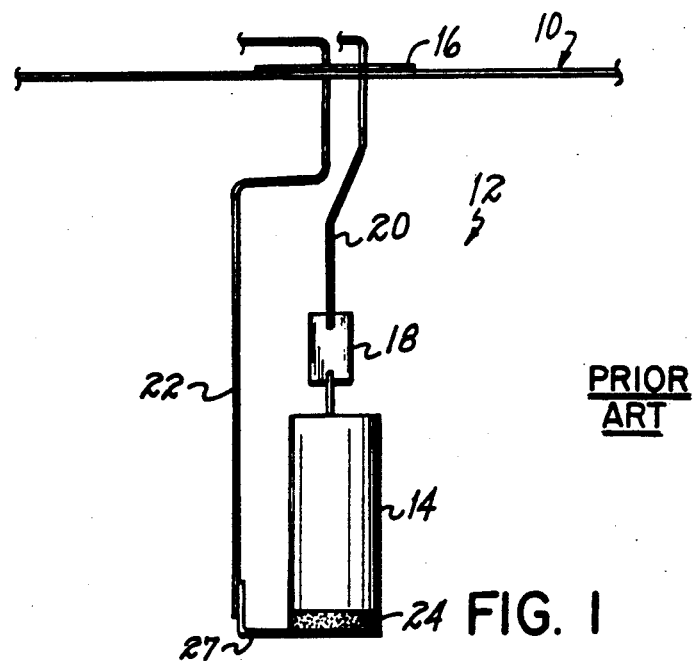
FIG. 1 PRIOR ART
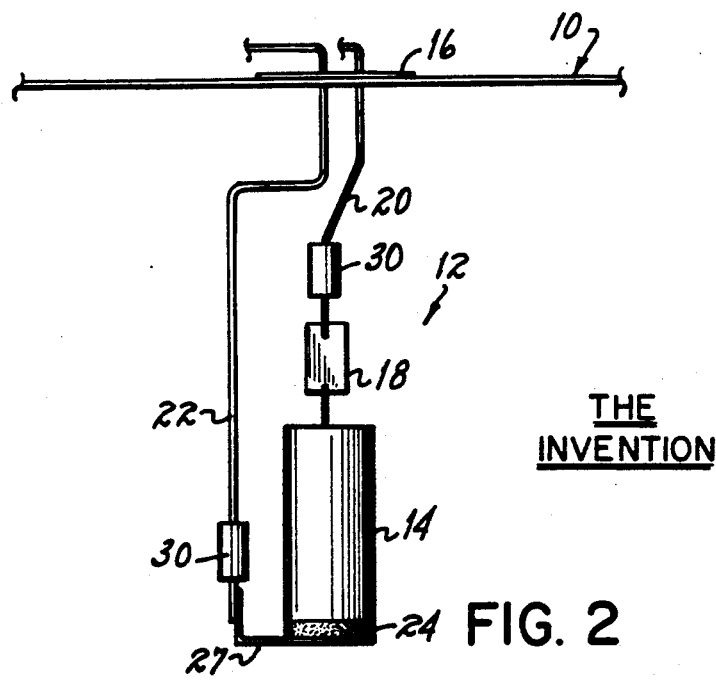
FIG. 2 THE INVENTION
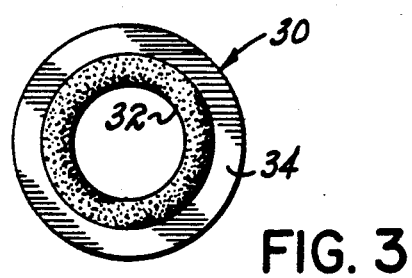
FIG. 3

5th HARMONIC

3rd HARMONIC

REST

APPARATUS AND METHOD FOR REDUCING VEHICULAR FUEL PUMP NOISE

FIELD OF THE INVENTION

This invention relates to means for reducing the noise generated by vehicular fuel pumps.

BACKGROUND

As automobile design has become more sophisticated, the level of noise inside the vehicle (so-called interior noise) has been dramatically reduced, to the point that in at least one case it is said is the loudest sound is the ticking of the clock. Sources of noise which were previously ignored have now become relatively more significant, and it has become desirable to reduce the interior noise from such sources. The noise of the fuel pump is relatively low but the fact that it operates continuously whether or not the vehicle is moving, makes its noise level more noticeable when other sources are inactive. Indeed, servicing of fuel pumps to reduce their contribution to interior noise is becoming a significant component of warranty service on new cars.

Fuel pumps are typically housed in a sealed, removable "sender unit" which is suspended inside the fuel tank itself. In addition to the pump, the sender unit also includes a pressure or feed line and a return line for returning fuel not consumed at the engine. Some sender units also include a "pulsator" between the pump and the pressure line, the purpose of which is to minimize the transmission of pump pressure pulsations to the pressure line.

When a fuel pump is operating it produces forces at its fundamental operating speed and at the harmonics of that speed. Those forces are converted into vibrational energy which is the source of noise inside the vehicle. The fuel pump vibration, which varies in both amplitude and frequency depending on the specific configuration of the pump, lines, tank, and vehicle body, is primarily transmitted from the pump to the sender unit through the pressure line and/or the return line, through a mounting cap to the tank and the vehicle body where it contributes to the interior noise.

The usual approach to controlling pump noise has been to reduce the level of vibration caused by the pump. This has been a particularly difficult problem to solve in practice. Elaborate attempts have been made to reduce pump vibration, including isolating the pump, damping the resonant vibration, and fine tuning the geometry of the lines at different locations. However, such attempts have been only partially successful because the dynamics of the system (pump, lines, tank, body, and interior cavity) are very complex and any change (even small) in the assembly, its age and operating conditions can tend eventually to minimize, or even negate any improvement. For example, previous attempts to isolate the pump vibration forces have resulted in good reduction in the vertical direction, but not in other directions. Vibrational energy is transmitted in all directions from the pump, that is, longitudinally of the pump axis as well as rotationally and laterally, and it is not practical to isolate vibration in directions other than vertical. For this and other reasons, prior attempts to reduce pump noise have proven insufficient, and there has been a need for a better way to reduce the noise component generated by the fuel pump in a vehicle.

BRIEF DESCRIPTION OF INVENTION

The vibration caused by a fuel pump includes both forced and resonant vibration components. The dynamic forces of the pump cause the lines of the sender unit to deform at the operating frequencies of the pump, and whenever the operating frequencies match the resonant frequencies of the system, the vibration is resonant. At all other frequencies the vibration is forced. It has been found that such systems generally have few resonant frequencies; and since the pumps have several excitation frequencies, the problem is more one of forced vibration than of resonant vibration.

Unlike resonant vibration, forced vibration is difficult to change because damping has no effect on it, and mass and/or stiffening changes have only a little effect. The isolation approach is suitable for forced vibration, but it is not practical to isolate a pump in all directions.

In accordance with this invention, fuel sender unit vibration is reduced by applying to the unit a reaction force at a location at which the vibration amplitude is relatively large, which reaction force is designed to occur within the frequency range of the major objectionable vibration and is out of phase with respect to the sender unit vibration. Because it is out of phase, the reaction force reduces the vibration at that location and elsewhere.

The device which generates this force can be referred to a passive vibrator. It is passive in that it is driven by excitation forces of the pump itself, not separately driven.

The passive vibrator can be mounted to any vibrating component of the sender unit but it is preferably positioned on the pump pressure line and/or the return line. In preferred form it comprises an annulus or collar of elastomeric material which is secured around the line, with an annular weight or mass surrounding the collar. The passive vibrator is best mounted at or near the point of maximum vibrational amplitude of the component, e.g., where the pressure and/or return line vibrates with maximum amplitude.

The passive vibrator is itself vibrated by the vibrator of the component to which it is attached. Its own vibration is out of phase with the input vibration. The frequency range and magnitude of its vibration are determined by appropriate selection of its mass, stiffness and damping values.

THE PRIOR ART

Jones et al U.S. Pat. No. 3,419,111 shows one type of visco-elastic energy dissipating device which provides absorption of the vibration of a mechanical device. That device operates by dissipating the resonant vibrational energy as heat.

My previous U.S. Pat. No. 3,601,228 shows a resonant beam and a visco-elastic link that is tuned to a given mode of input vibration which causes the beam to resonate. The resonant beam introduces a large deformation in the high damping visco-elastic material, which in turn dissipates the vibrational energy to reduce the vibrational amplitudes of the structure to which it is attached.

DESCRIPTION OF THE DRAWINGS

The invention can best be further described by reference to the drawings, in which:

FIG. 1 is a diagrammatic view of a conventional sender unit in a fuel tank;

FIG. 2 is a diagrammatic view of a fuel pump system having two passive vibrators mounted to its lines, in accordance with the invention;

FIG. 3 is a top plan view of a passive vibrator;

DETAILED DESCRIPTION

Figure 4C:
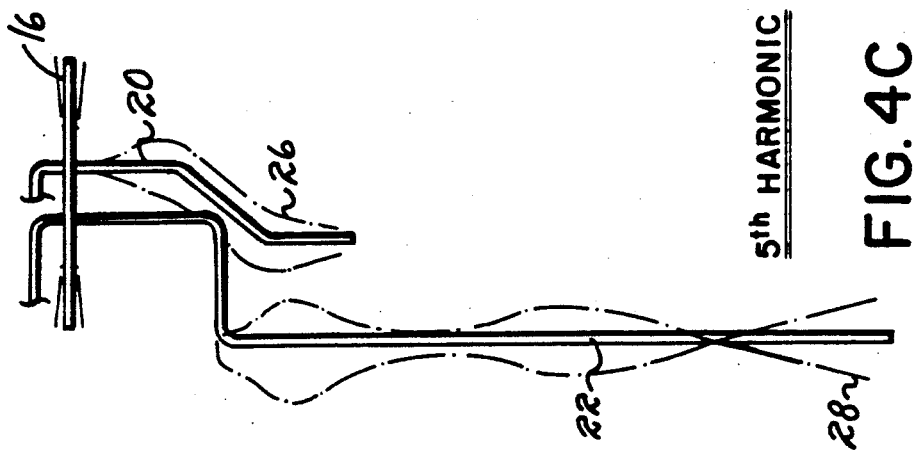
FIGS. 4A, B and C are a series of diagrammatic views which show the modes of vibration of the lines of one type of fuel pump assembly in accordance with the invention, at rest and at different frequencies.

Referring to FIG. 1 of the drawings, a typical vehicular fuel tank 10 has mounted within it a sender unit 12 having a fuel pump 14 which can be of a type known per se. The sender unit is supported from a cover 16 which is secured and sealed to tank 10, usually but not necessarily at the top of the tank. The pump, which is operated by an electric motor housed within it, is usually connected through a pulsator 18 to a pressure or output line 20. The function of the pulsator 18 is to reduce the amount of fluid pulsation energy transmitted from the pump, rather than the mechanical energy. A return line 22 returns unused fuel from the engine to the tank. It will be noted that both the pressure line 20 and the return line 22 have angular offsets or bends near the points at which they pass through the cover 16. These not only accommodate space requirements but also help minimize transmission of vibration between pump 14 and cover 16. The pump is often mounted on an elastomeric pad 24 to help isolate it from the return line, the pad being mounted on a lower bracket 27 attached to the return line. The pump assembly as thus described is conventional, and illustrates one type of environment in which the invention is useful.

Figure 4B:
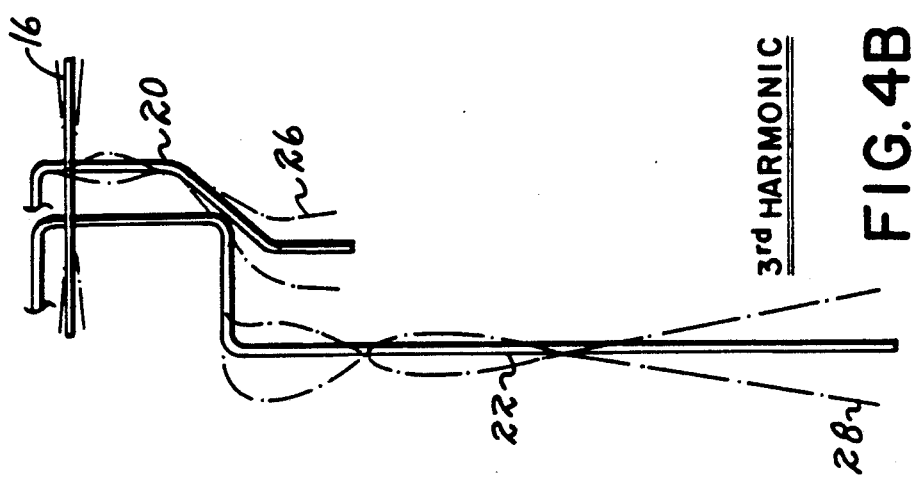
Figure 4A:
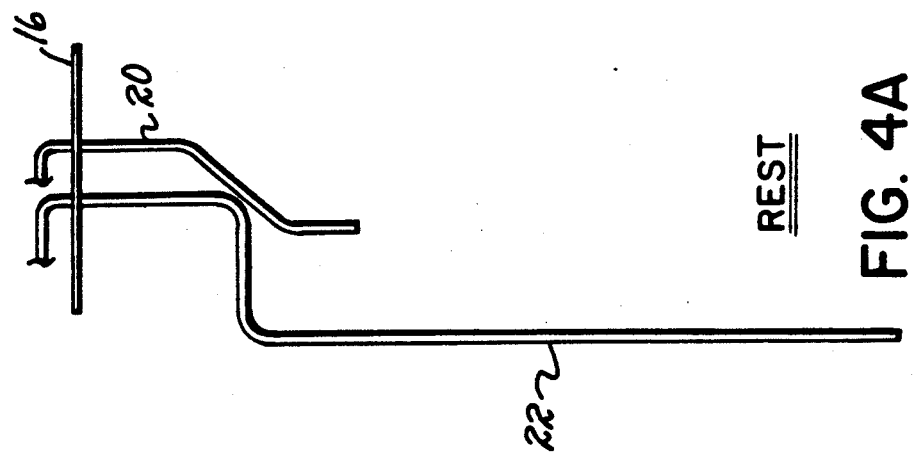

When operating, the pump causes the other sender system components to vibrate. The "envelopes" of the shapes of the pressure and return lines at rest and at operating conditions for two of the pump excitation frequencies are shown diagrammatically in FIGS. 4A, B and C. When the pump is not operating it of course causes no vibration in the lines (FIG. 4A). When operating, the deformation shape and amplitude of vibration of the lines vary with the pump excitation frequencies, FIG. 4B depicting the "shape" (envelope) of the lines at the fifth harmonic of the pump frequency, and FIG. 4C the shape at the fifth harmonic of the pump frequency. The deformation of the lines illustrated in FIGS. 4B and C is typically of the forced type; it does not have to occur at the resonances in the lines at those particular frequencies to have these shapes. In the particular sender unit configuration used for purposes of explanation, the amplitude of vibration of the pressure line 20 was greatest below the bend, as designated at 26; and the vibration of the return line 22 was greatest near the bend and also near the pump intake, as designated at 28. Similar deformation patterns have been generated for the lines at the other harmonics of the pump excitation frequencies within the range of importance to the interior noise (about 200 Hz to 600 Hz).

Figure 5:
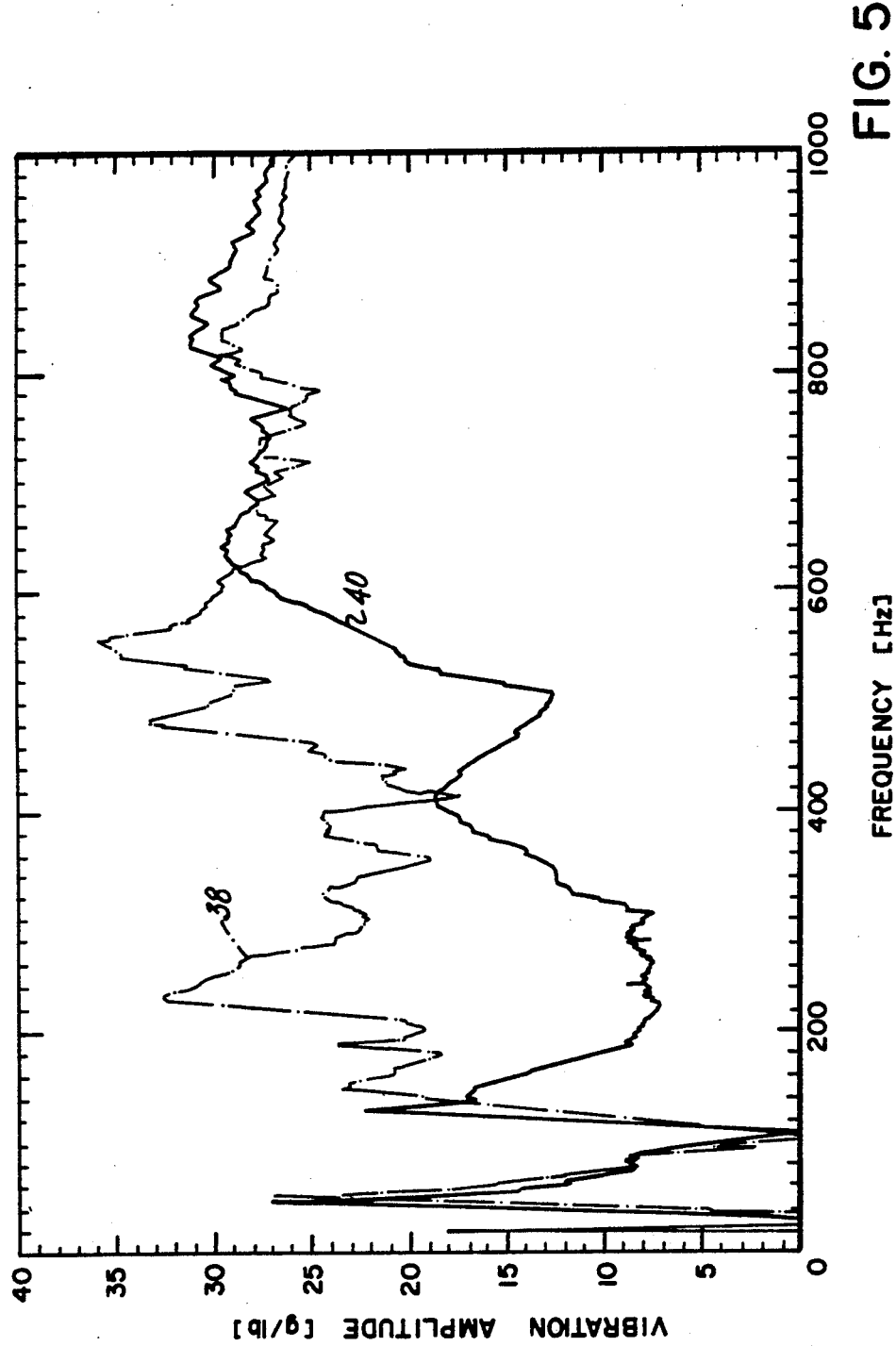
FIG. 5 is a graph illustrating the effect of the passive vibrator on the amplitude of fuel pump vibration, over a range of frequencies.

FIG. 5 shows the amplitude of vibration measured on the pressure line of a typical system, over a range of frequencies. Amplitude is plotted as acceleration/force in g./lb. The phantom line 38 shows vibration without the invention. While some vibration occurs at frequencies higher than are plotted in the figure, i.e., above 1000 Hz, such high frequency vibration is of little importance from the standpoint of interior noise.

Figure 6:
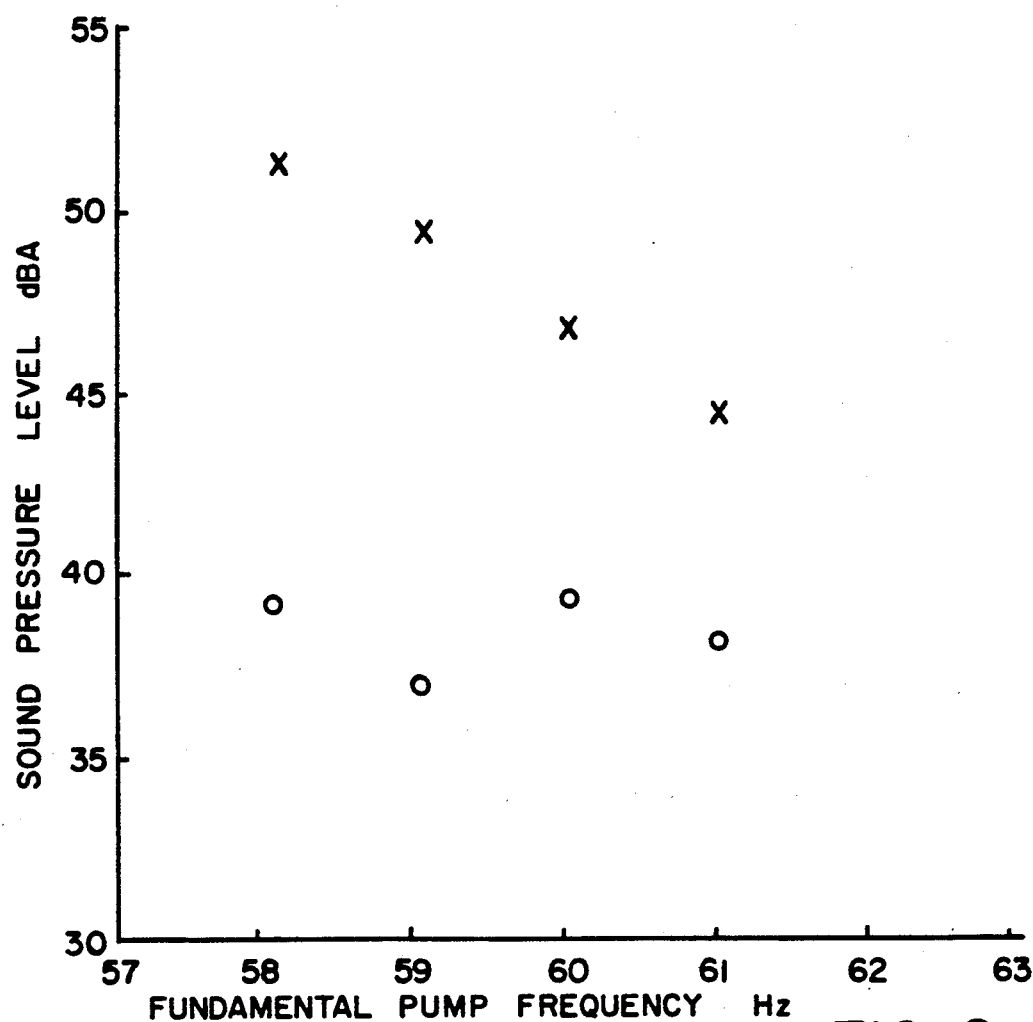
FIG. 6 is a graph which illustrates the comparative effect of the passive vibrator on the interior noise level in the back seat passenger location of an automobile, at different pump operating speeds.

FIG. 6 illustrates by [x] the sound level of a conventional pump, in terms of overall sound pressure level in dBA. The noise level was measured in the back seat of a vehicle at rest with the fuel pump operating near its designed speed of about 3600 rpm (1st harmonic=60 Hz, 2nd harmonic=120 Hz, 3rd harmonic=180 Hz, etc.). For the particular pump tested, the noise level (above 50 dBA) was highest at a pump rotation frequency of 58 Hz, and dropped to about 44 dBA at 61 Hz. Such noise levels have caused objections from new vehicle owners.

In accordance with the method of this invention, fuel pump noise is minimized by first determining the major frequency range over which the objectionable noise arises, and the deformation pattern in that range. With reference to FIG. 5, this is usually in the range of approximately 200–600 Hz. The techniques and apparatus for making such determinations of noise and vibration frequency and amplitude are known. For example, the important frequency range can be measured by placing a microphone inside the vehicle and recording the signal for analysis. The vibration deformation patterns are measured by placing accelerometers on various parts of the sender unit while the pump is operating and analyzing the measured vibration for its amplitude and phase angle at the various harmonics of the pump frequencies where the noise was noted to be large.

Given that information, a passive vibrator comprising a weight and an elastomeric spring is then designed to provide a reaction force which, over the important frequency range, has a magnitude sufficient at least to partially offset the measured pump vibration. More specifically, the vibrator includes a weight having a designed mass and a spring having designed stiffness, mass and damping values which are selected to cause the source to resonate in that frequency range. Techniques for designing a weighted spring of a specific desired stiffness, mass, and damping are well known in the art, and therefore are not described herein.

FIG. 3 illustrates a preferred form of passive vibrator 30 having an annular spring means in the form of an annulus or collar 32 of rubber or other visco-elastic material, sized to be slipped on the pressure or return line and adhesively secured in place. The spring means is surrounded by a denser mass 34 which can also be in the form of a collar or ring, peripherally bonded to the spring 32. For the particular pump used for purposes of illustration, the rubber spring consisted of a fluoro-silicone base material having the desired stiffness and damping values in addition to fuel resistant properties. Its approximate dimensions are 0.25 in. inside diameter, 0.50 in. outside diameter, and 0.5 in. height. The weight of the mass 34 is about 25 gms. However, it will be realized that the particular shape of the mass will vary with the specific situation. What is critical is that, when subjected to pump vibration within the desired frequency range, the vibrator vibrates in that range, out of phase with the input vibration, and with sufficient magnitude to cause a lower net vibration. Thus, depending on the specific pump system configuration the spring can be metal, rubber, composite, or plastic, to provide the calculated required performance. It can be designed to offset horizontal or torsional vibration instead of longitudinal vibration, or a combination of them. The use of a vibrator in the form of a beam, plate, ring, or other shape is contemplated as alternatives.

As shown in FIG. 2, the passive vibrator is most conveniently installed on the pressure line 20 and/or return line 22, near the respective position 26 or 28 of maximum vibration of that element.

The solid line 40 in FIG. 5 indicates the effect of the invention in reducing the effect of vibration of one common type of pump. As can be seen, this invention reduces the vibration not only at the peaks but for the entire frequency range of interest from about 200 to 600 Hz. Moreover, the modified fuel pump did not have such sharp amplitude spikes as the unmodified pump.

As can be seen, the particular embodiment of the invention tested in FIG. 5 does not have much effect at frequencies below about 170 Hz or above about 600 Hz. Those frequencies, however, are not major components of noise measured inside the vehicle and they are not so objectionable even if not reduced.

The practical effect of the invention on measured interior noise, in the absence of other sources of noise, is shown in FIG. 6. At a pump operating rate of 58 Hz the overall sound pressure level in the rear seat passenger location was more than 50 dBA without the invention; with it the noise was only 39 dBA. Noise level of the unmodified system dropped as pump rpm increased, but even at 61 Hz it was reduced from about 44 to about 38 dBA.

As already pointed out, the passive vibrator can conveniently be mounted directly on the pressure line and/or the return line. However, a device in accordance with the invention can be mounted to the pump itself, or on the pulsator, or on the isolator which supports the pump, or between the pump and the pulsator, depending on the measured deformation of the particular sender unit. In practice, however, it is presently preferred to mount the device to the pressure line as described above.

Having described the invention, what is claimed is:

1. In a vehicular fuel pump system including a fuel pump and at least one fuel line mounted inside a fuel tank, noise reduction means comprising, a passive vibrator mounted inside said tank to said line, at a position on said line at which said line vibrates at substantially its maximum amplitude, said vibrator comprising spring means mounting a weight to said line, said vibrator having a mass and said spring means having stiffness and damping values selected to cause said vibrator to vibrate resonantly when said line vibrates, out of phase with respect to the vibration of said line and at an amplitude of sufficient magnitude to at least partially reduce the vibration of said line, said vibrator being connected to said pump and tank only through said line.

2. The fuel pump noise reduction means of claim 1 wherein said passive vibrator resonates in the range of about 200–600 Hz.

3. The fuel pump noise reduction means of claim 1 wherein said fuel pump is connected between a pressure line and a return line in said tank, and said passive vibrator is connected to at least one of said lines, at a position thereon in said tank.

4. The fuel pump noise reduction means of claim 1 wherein said passive vibrator is annular and has an axial aperture in which said line is secured.

5. The fuel pump noise reduction means of claim 4 wherein said aperture is in said spring means and said weight surrounds said spring means.

6. The fuel pump noise reduction means of claim 1 wherein said fuel pump is housed in a sender unit, said sender unit being mounted in said tank.

7. A method of reducing objectionable noise generated by a vibrating element of a fuel pump system, said method comprising, determining the major frequency range of said objectionable noise, and the deformation patterns of said vibrating element during operation, providing a passive vibrator which comprises a weight and a spring, said vibrator having a mass and said spring having a stiffness and damping values selected to cause said vibrator to resonate in said frequency range and to provide a reaction force which is out of phase with the vibration of the vibrating element, and of magnitude over said frequency range sufficient at least to partially offset the vibration of said element, and mounting the vibrator to said element at a position on said element at which the vibration of said element is at substantially its maximum amplitude, said vibrator connected to said system only through said element.

8. The method of claim 7 wherein said passive vibrator is mounted to a pressure line of said pump.

9. The method of claim 7 wherein said passive vibrator is mounted to a fuel return line of said pump.

10. The method of claim 7 wherein passive vibrators are mounted to both pressure and return lines of said pump.

11. The method of claim 7 wherein said vibrator is mounted to said element by sliding it longitudinally along said element to said position of maximum amplitude.

* * * * *